United States Patent
Zhang et al.

(10) Patent No.: US 11,523,428 B2
(45) Date of Patent: Dec. 6, 2022

(54) RANDOM ACCESS METHOD, TERMINAL DEVICE AND NETWORK DEVICE

(71) Applicant: VIVO MOBILE COMMUNICATION CO., LTD., Chang'an Dongguan (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/158,292

(22) Filed: Jan. 26, 2021

(65) Prior Publication Data

US 2021/0153246 A1 May 20, 2021

Related U.S. Application Data

(63) Continuation of application No. PCT/CN2019/097477, filed on Jul. 24, 2019.

(30) Foreign Application Priority Data

Jul. 26, 2018 (CN) .......................... 201810837896.7

(51) Int. Cl.
*H04W 74/00* (2009.01)
*H04W 76/30* (2018.01)
*H04W 76/27* (2018.01)
*H04L 1/18* (2006.01)
(Continued)

(52) U.S. Cl.
CPC ......... *H04W 74/008* (2013.01); *H04L 1/1816* (2013.01); *H04W 74/0833* (2013.01); *H04W 76/27* (2018.02); *H04W 76/30* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 6,259,724 B1 | 7/2001 | Esmailzadeh | |
| 2017/0111886 A1* | 4/2017 | Kim | ...... H04W 72/042 |
| 2017/0318606 A1* | 11/2017 | Lee | ........ H04W 72/14 |

(Continued)

FOREIGN PATENT DOCUMENTS

| | | |
|---|---|---|
| CN | 1166241 C | 9/2004 |
| CN | 106714315 A | 5/2017 |

(Continued)

OTHER PUBLICATIONS

3GPP 37.324 vers. 1.5.0 (Apr. 2018) 3rd Generation Parntership Project; Technical Specification Group Radio Access Network; E-UTRA and NR; Service Data Adaption Protocol (SDAP) Specification (Release 15) (Year: 2018).*

(Continued)

*Primary Examiner* — Jamaal Henson
(74) *Attorney, Agent, or Firm* — von Briesen & Roper, s.c.

(57) ABSTRACT

Provided are a random access method, a terminal device and a network device. The random access method includes transmitting a two-step random access request message to a network device. A data part is carried in the two-step random access request message, and the data part is acquired through performing layer-two processing in accordance with layer-two configuration information.

20 Claims, 2 Drawing Sheets transmitting a two-step random access request message to a network device, wherein a data part is carried in the two-step random access request message, and the data part is acquired through performing layer-two processing in accordance with layer-two configuration information — 101

(51) Int. Cl.
*H04W 74/08* (2009.01)
*H04W 80/02* (2009.01)

(56) References Cited

U.S. PATENT DOCUMENTS

| | | | | |
|---|---|---|---|---|
| 2018/0132168 | A1* | 5/2018 | Ingale | H04W 72/042 |
| 2018/0205516 | A1 | 7/2018 | Jung et al. | |
| 2018/0206227 | A1 | 7/2018 | Jiang | |
| 2018/0270869 | A1* | 9/2018 | Tsai | H04W 74/006 |
| 2018/0279375 | A1* | 9/2018 | Jeon | H04W 74/0833 |
| 2019/0174554 | A1* | 6/2019 | Deenoo | H04L 5/0048 |
| 2019/0174571 | A1* | 6/2019 | Deenoo | H04W 76/11 |
| 2019/0350000 | A1 | 11/2019 | Zhang et al. | |
| 2019/0357266 | A1 | 12/2019 | Ren et al. | |
| 2020/0213894 | A1* | 7/2020 | Agiwal | H04W 76/15 |

FOREIGN PATENT DOCUMENTS

| | | |
|---|---|---|
| CN | 106793057 A | 5/2017 |
| CN | 107872899 A | 4/2018 |
| CN | 108282897 A | 7/2018 |
| WO | 2018031603 A1 | 2/2018 |
| WO | 2018064367 A1 | 4/2018 |
| WO | 2018127549 A1 | 7/2018 |

OTHER PUBLICATIONS

Huawei et al.; "The content of AS context for inactive UE"; 3GPP TSG-RAN WG2 Meeting #AH1807, Montreal (Quebec), Canada, Jul. 2-6, 2018; R2-1810358.

Extended European Search Report related to Application No. 19841268.6; dated Sep. 1, 2021.
International Search Report & Written Opinion related to Application No. PCT/CN2019/097477; dated Oct. 8, 2019.
First Chinese Office Action for related Application No. 201810837896.7 dated Dec. 18, 2020.
Ericsson, "Baseline solution for small data transmission in RRC_INACTIVE", Nov. 14-18, 2016, 3GPP TSG-RAN WG2 #96, Reno, Nevada, Tdoc R2-168713.
Huawei, et al., Summary of email discussion [NR-AH1#13][NR] UL data in INACTIVE, Feb. 13-17, 2017, 3GPP TSG-RAN WG2 #97, Athens, Greece, R2-1701125.
Ericsson, "TP for small UL data transmission in RRC_INACTIVE", Feb. 13-17, 2017, 3GPP TSG-RAN WG2 #97, Athens, Greece, Tdoc R2-1702339.
Interdigital Inc., "Scheduling enhancements for NR-based access to unlicensed spectrum", May 21-25, 2018, 3GPP TSG-RAN WG2 Meeting #102m Busan, Korea, R2-1806837.
Ericsson, "Small data transmission for inactive UES", Oct. 10-14, 2016, 3GPP TSG-RAN WG2 #95bis, Kaohsiung, Taiwan, Tdoc R2-166922.
Indian Office Action related to Application No. 202127008242 dated Jan. 19, 2022.
First Japanese Office Action related to Application No. 2021-504430 dated Apr. 15, 2022.
R2-1700890, Source: Ericsson, "Details of solution 8 for small data transmission in RRC_INACTIVE" Agenda Item: 10.2.2.2, Document for: Discussion, Decision, 3GPP TSG-RAN WG2 #97,Athens, Greece, dated Feb. 13-17, 2017.

* cited by examiner transmitting a two-step random access request message to a network device, wherein a data part is carried in the two-step random access request message, and the data part is acquired through performing layer-two processing in accordance with layer-two configuration information — 101

Fig.1 receiving a two-step random access request message from a terminal device, wherein a data part is carried in the two-step random access request message, and the data part is acquired through performing layer-two processing in accordance with layer-two configuration information — 201

RANDOM ACCESS METHOD, TERMINAL DEVICE AND NETWORK DEVICE

CROSS-REFERENCE TO RELATED APPLICATION

The present application is a continuation of PCT Application No. PCT/CN2019/097477 filed on Jul. 24, 2019, which claims a priority of the Chinese patent application No. 201810837896.7 filed in China on Jul. 26, 2018, which is incorporated herein by reference in its entirety.

TECHNICAL FIELD

The present disclosure relates to the field of communications technology, in particular to a random access method, a terminal device and a network device.

BACKGROUND

Currently, the introduction of a simplified two-step contention-based random access process has been discussed in a $5^{th}$-generation (5G) new radio (NR) system, so as to reduce a delay for contention-based random access. The simplified two-step contention-based random access process includes the following steps.

Step 1: a network side configures for a terminal device, e.g., a user equipment (UE), configuration information desired for two-step random access, e.g., random access resources for a two-step random access request message Msg1.

Step 2: the UE selects a random access resource, and transmits a selected random access signal (preamble) to a network device, e.g., a base station, through the random access resource. Meanwhile, a UE identity is carried in the Msg1, so that the base station may determine the UE which has transmitted the random access request in accordance with the UE identity. In addition, user plane data may also be carried in the Msg1, so as to be adapted to small data transmission for an inactive UE, thereby to reduce a signaling overhead when a state of the UE is switched.

Step 3: the base station transits a two-step random access response message to the UE. The UE identity may be carried in the two-step random access response message and use to indicate whether the UE has performed contention-based access successfully. When the UE has performed the contention-based access successfully, such information as timing advance and uplink grant may be also be carried in the two-step random access response message.

For the UE not in a connected state, the small data transmission may be performed on the basis of the simplified two-step contention-based random access process. As compared with a four-step contention-based random access process, it is able for the two-step contention-based random access process to reduce an access delay. However, in the two-step random access process, currently protocol stack configuration information desired for data carried in the request message has not been specified yet, and the data may be e.g., control plane data for a radio resource control (RRC) connection establishment request and the like, and the user plane data.

SUMMARY

An object of the present disclosure is to provide a random access method, a terminal device and a network device, so as to solve the problem that the protocol stack configuration information desired for the data carried in the request message in the two-step random access process has currently not been specified yet.

In order to solve the above problem, in a first aspect, the present disclosure provides in some embodiments a random access method for a terminal device, including transmitting a two-step random access request message to a network device. A data part is carried in the two-step random access request message, and the data part is acquired through performing layer-two processing in accordance with layer-two configuration information.

In a second aspect, the present disclosure provides in some embodiments a random access method for a network device, including receiving a two-step random access request message from a terminal device. A data part is carried in the two-step random access request message, and the data part is acquired through performing layer-two processing in accordance with layer-two configuration information.

In a third aspect, the present disclosure provides in some embodiments a terminal device, including a first transmission module configured to transmit a two-step random access request message to a network device. A data part is carried in the two-step random access request message, and the data part is acquired through performing layer-two processing in accordance with layer-two configuration information.

In a fourth aspect, the present disclosure provides in some embodiments a network device, including a first reception module configured to receive a two-step random access request message from a terminal device. A data part is carried in the two-step random access request message, and the data part is acquired through performing layer-two processing in accordance with layer-two configuration information.

In a fifth aspect, the present disclosure provides in some embodiments a communication device, including a memory, a processor, and a computer program stored in the memory and executed by the processor. The computer program is executed by the processor so as to implement the step of the above-mentioned random access method for the terminal device or the step of the above-mentioned random access method for the network device. The terminal device may be a terminal device or a network device.

In a sixth aspect, the present disclosure provides in some embodiments a computer-readable storage medium storing therein a computer program. The computer program is executed by a processor so as to implement the step of the above-mentioned random access method for the terminal device or the step of the above-mentioned random access method for the network device.

According to the embodiments of the present disclosure, the data part carried in the two-step random access request message may be acquired in accordance with the layer-two configuration information. As a result, it is able to specify protocol stack configuration information desired for data carried by the request message in a two-step random access process, thereby to enable the data part carried in the two-step random access request message to be accurately received by a network side, and improve the data transmission reliability.

BRIEF DESCRIPTION OF THE DRAWINGS

In order to illustrate the technical solutions of the embodiments of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to illustrate the technical solutions of the embodiments of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

Figure 1:
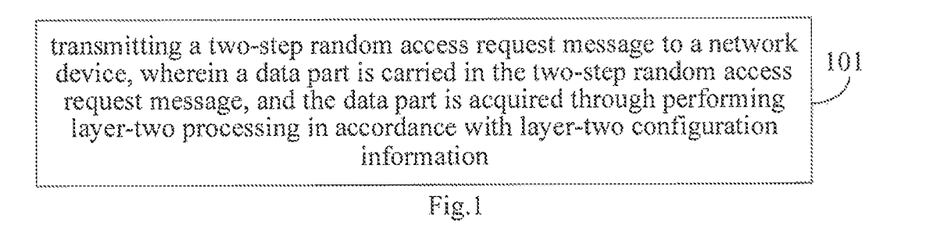
FIG. 1 is a flow chart of a random access method according to an embodiment of the present disclosure.

As shown in FIG. 1, the present disclosure provides in some embodiments a random access method for a terminal device, which includes Step 101 of transmitting a two-step random access request message to a network device, wherein a data part is carried in the two-step random access request message, and the data part is acquired through performing layer-two processing in accordance with layer-two configuration information.

Optionally, the two-step random access request message may be an Msg1.

It should be appreciated that, the layer-two configuration information may be agreed in a protocol, or configured by a network side. When it is configured by the network side, prior to Step 101, the method may further include receiving, by the terminal device, the layer-two configuration information from the network device.

Optionally, the layer-two configuration information may be received through a system broadcasting message, or an RRC release message.

According to the random access method in the embodiments of the present disclosure, the data part carried in the two-step random access request message may be acquired in accordance with the layer-two configuration information. As a result, it is able to specify protocol stack configuration information desired for data carried by the request message in a two-step random access process, thereby to enable the data part carried in the two-step random access request message to be accurately received by the network side, and improve the data transmission reliability.

In an embodiment of the present disclosure, optionally, a configuration type of the layer-two configuration information may be a cell-specific configuration or a radio access network (RAN)-specific configuration.

When the configuration type of the layer-two configuration information is the cell-specific configuration, after the completion of cell reselection, the terminal device may update the layer-two configuration information desired for two-step random access as layer-two configuration information corresponding to a new cell in accordance with agreement in a protocol, or update the layer-two configuration information desired for the two-step random access as the layer-two configuration information corresponding to the new cell in accordance with the acquired system broadcasting message of the new cell.

In an embodiment of the present disclosure, optionally, the layer-two configuration information may include at least one of service data adaption protocol (SDAP) layer configuration information, packet data convergence protocol (PDCP) layer configuration information, radio link control (RLC) layer configuration information, and media access control (MAC) layer configuration information.

It should be appreciated that, in actual use, the SDAP layer configuration information may include default data radio bearer (DRB) information. The network side may configure one or more default DRBs for the terminal device. For example, when three default DRBs are configured for the terminal device, these three default DRBs may carry data streams that meet high, middle and low service requirements respectively.

The PDCP layer configuration information may include indication information indicating that a default value of a size of a PDCP sequence number (SN) is a short PDCP SN size, and the short PDCP SN size may be a shortest one of all of the PDCP SN sizes. The short PDCP SN size may be 12 bits currently supported by a protocol, or a newly-introduced SN size, e.g., 8 bit.

The RLC layer configuration information may include indication information indicating that a default RLC transmission mode is a TM mode.

The MAC layer configuration information may include a default value of logic channels, a corresponding priority value of each logic channel, and a default value of maximum hybrid automatic repeat request (HARQ) retransmission times. The network side may configure one or more default logic channels and the corresponding priority values for the terminal device. For example, when there default logic channels are configured for the terminal device, these three default logic channels may carry DRB data for the data streams that meet the high, middle and low service requirements respectively.

Optionally, when the layer-two configuration information includes the SDAP layer configuration information and the SDAP layer configuration information includes the default DRB information, prior to Step 101, the method may further include mapping, through an SDAP layer entity, data delivered by an upper layer to a default DRB corresponding to the default DRB information, and delivering the data to a PDCP layer entity associated with the default DRB, so as to acquire the data part carried in the two-step random access request message.

It should be appreciated that, usually the SDAP layer entity may process user plane data delivered by a service layer.

Further or alternatively, when the layer-two configuration information includes the PDCP layer configuration information and the PDCP layer configuration information includes the indication information indicating that the default value of the PDCP SN size is the short PDCP SN size, prior to Step 101, the method may further include numbering, through a PDCP layer entity, data delivered by the SDAP layer entity in accordance with the short PDCP SN size, and delivering the numbered data to an RLC layer entity, so as to acquire the data part carried in the two-step random access request message. In addition, in this process, a data number may be carried in a PDCP sub-header. Parameters (e.g., COUNT) desired for security handling may be maintained on the basis of the PDCP SN.

Further or alternatively, when the layer-two configuration information includes the RLC layer configuration information and the RLC layer configuration information includes the indication information indicating that the default RLC transmission mode is the TM mode, prior to Step 101, the method may further include directly delivering, through an RLC layer entity, data delivered by a PDCP layer entity to an MAC layer entity via a logic channel in the TM mode, i.e., not processing the data delivered by the PDCP layer entity, so as to acquire the data part carried in the two-step random access request message.

Further or alternatively, when the layer-two configuration information includes the MAC layer configuration information and the MAC layer configuration information includes a default value of a logic channel and the priority value corresponding to the logic channel, prior to Step 101, the method may further include, when data has been received through an MAC layer entity from a plurality of default logic channels, multiplexing a logic channel for data transmission in accordance with the priority values corresponding to the plurality of default logic channels. For example, preferably, a logic channel with a largest priority value may be multiplexed.

In an embodiment of the present disclosure, optionally, subsequent to Step 101, the method may further include: receiving a two-step random access response message transmitted from the network device; and when the two-step random access response message includes indication information indicating that the data part has not been received successfully yet, retransmitting the data part in accordance with the default maximum HARQ retransmission times.

When the network device has decoded the data part carried in the two-step random access request message successfully, the two-step random access response message may be used to feed back that the data part has been received successfully. When the network device fails to decode the data part carried in the two-step random access request message, the two-step random access response message may be used to feed back that the data part has not been received successfully yet. In this regard, when the network device fails to decode the data part, the data part may be retransmitted, so as to enable the network device to successfully receive the accurate data.

Figure 2:
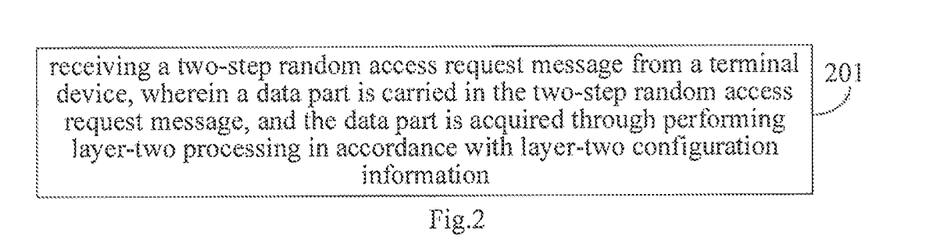
FIG. 2 is a flow chart of another random access method according to an embodiment of the present disclosure.

As shown in FIG. 2, the present disclosure further provides in some embodiments a random access method for a network device, which includes Step 201 of receiving a two-step random access request message from a terminal device, wherein a data part is carried in the two-step random access request message, and the data part is acquired through performing layer-two processing in accordance with layer-two configuration information.

Optionally, the two-step random access request message may be an Msg1.

It should be appreciated that, the layer-two configuration information may be agreed in a protocol, or configured by a network side. When it is configured by the network side, prior to Step 201, the method may further include transmitting, by the network device, the layer-two configuration information to the terminal device.

Optionally, the layer-two configuration information may be transmitted through a system broadcasting message, or an RRC release message.

According to the random access method in the embodiments of the present disclosure, the data part carried in the two-step random access request message may be acquired in accordance with the layer-two configuration information. As a result, it is able to specify protocol stack configuration information desired for data carried by the request message in a two-step random access process, thereby to enable the data part carried in the two-step random access request message to be accurately received by the network side, and improve the data transmission reliability.

In an embodiment of the present disclosure, optionally, a configuration type of the layer-two configuration information may be a cell-specific configuration or an RAN-specific configuration.

Optionally, the layer-two configuration information may include at least one of SDAP layer configuration information, PDCP layer configuration information, RLC layer configuration information, and MAC layer configuration information.

Optionally, subsequent to Step 201, the method may further include: decoding, through an MAC layer entity, the data part; when the MAC layer entity has successfully decoded the data part, feeding back that the data part has been successfully received through a two-step random access response message; and when the MAC layer entity fails to decode the data part, feeding back that the data part has not been received successfully yet through the two-step random access response message.

The random access methods have been described hereinabove, and the terminal device and the network device will be described hereinafter in conjunction with the embodiments and drawings.

Figure 3:
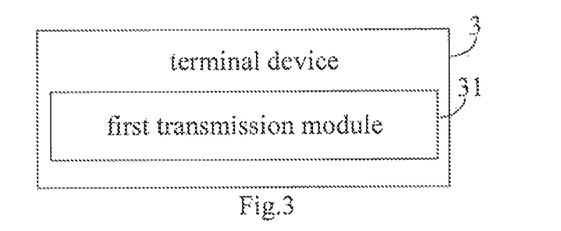
FIG. 3 is a structural schematic view showing a terminal device according to an embodiment of the present disclosure.

As shown in FIG. 3, the present disclosure further provides in some embodiments a terminal device 3, which includes a first transmission module 31 configured to transmit a two-step random access request message to a network device. A data part is carried in the two-step random access request message, and the data part is acquired through performing layer-two processing in accordance with layer-two configuration information.

According to the terminal device in the embodiments of the present disclosure, the data part carried in the two-step random access request message may be acquired in accordance with the layer-two configuration information. As a result, it is able to specify protocol stack configuration information desired for data carried by the request message in a two-step random access process, thereby to enable the data part carried in the two-step random access request message to be accurately received by a network side, and improve the data transmission reliability.

In an embodiment of the present disclosure, optionally, the layer-two configuration information may include at least one of SDAP layer configuration information, PDCP layer configuration information, RLC layer configuration information and MAC layer configuration information.

Optionally, the terminal device may further include a second reception module configured to receive the layer-two configuration information transmitted from the network device.

Optionally, the layer-two configuration information may be received through a system broadcasting message or an RRC release message.

Optionally, a configuration type of the layer-two configuration information may be a cell-specific configuration or an RAN-specific configuration.

Optionally, when the configuration type of the layer-two configuration information is the cell-specific configuration, after the completion of cell reselection, the terminal device may update the layer-two configuration information as layer-two configuration information corresponding to a new cell in accordance with agreement in a protocol, or update the layer-two configuration information as the layer-two configuration information corresponding to the new cell in accordance with the acquired system broadcasting message of the new cell.

Optionally, the terminal device 3 may further include a processing module configured to: when the layer-two configuration information includes the SDAP layer configuration information and the SDAP layer configuration information includes default DRB information, map, through an SDAP layer entity, data delivered by an upper layer to a default DRB corresponding to the default DRB information, and deliver the data to a PDCP layer entity associated with the default DRB, so as to acquire the data part; and/or when the layer-two configuration information includes the PDCP layer configuration information, and the PDCP layer configuration information includes indication information indicating that a default value of a PDCP SN size is a short PDCP SN size, and the short PDCP SN size is a shortest one of all of the PDCP SN sizes, number, through the PDCP layer entity, data delivered by the SDAP layer entity in accordance with the short PDCP SN, and deliver the numbered data to an RLC layer entity, so as to acquire the data part; and/or when the layer-two configuration information includes the RLC layer configuration information and the RLC layer configuration information includes indication information indicating that a default RLC transmission mode is a TM mode, directly deliver, through an RLC layer entity, data delivered by the PDCP layer entity to an MAC layer entity via a logic channel in the TM mode, so as to acquire the data part; and/or when the layer-two configuration information includes the MAC layer configuration information, the MAC layer configuration information includes a default value of a logic channel and a priority value corresponding to the logic channel, and data has been received through the MAC layer entity from a plurality of default logic channels, multiplex a logic channel for data transmission in accordance with the priority values corresponding to the plurality of default logic channels.

Optionally, the terminal device 3 may further include: a third reception module configured to receive a two-step random access response message transmitted from the network device; and a retransmission module configured to, when the two-step random access response message includes indication information indicating that the data part has not been received successfully yet, retransmit the data part in accordance with default maximum HARQ retransmission times.

Figure 4:
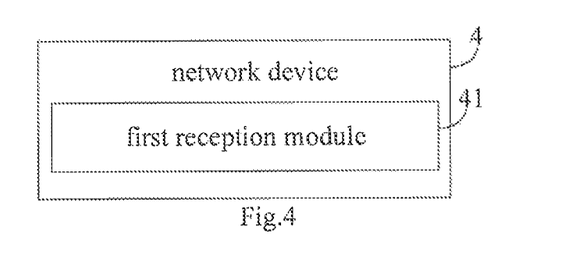
FIG. 4 is a structural schematic view showing a network device according to an embodiment of the present disclosure.

As shown in FIG. 4, the present disclosure further provides in some embodiments a network device 4, which includes a first reception module 41 configured to receive a two-step random access request message from a terminal device, wherein a data part is carried in the two-step random access request message, and the data part is acquired through performing layer-two processing in accordance with layer-two configuration information.

According to the network device in the embodiments of the present disclosure, the two-step random access request message may be received from the terminal device, and the data part carried in the two-step random access request message may be acquired in accordance with the layer-two configuration information. As a result, it is able to specify protocol stack configuration information desired for data carried by the request message in a two-step random access process, thereby to enable the data part carried in the two-step random access request message to be accurately received by a network side, and improve the data transmission reliability.

In an embodiment of the present disclosure, optionally, the layer-two configuration information may include at least one of SDAP layer configuration information, PDCP layer configuration information, RLC layer configuration information and MAC layer configuration information.

Optionally, the network device 4 may further include a second transmission module configured to transmit the layer-two configuration information to the terminal device.

Optionally, the layer-two configuration information may be transmitted through a system broadcasting message or an RRC release message.

Optionally, a configuration type of the layer-two configuration information may be a cell-specific configuration or an RAN-specific configuration.

Optionally, the network device 4 may further include: a decoding module configured to decode, through an MAC layer entity, the data part; and a third transmission module configured to, when the MAC layer entity has successfully decoded the data part, feed back that the data part has been successfully received through a two-step random access response message; or when the MAC layer entity fails to decode the data part, feed back that the data part has not been received successfully yet through the two-step random access response message.

The present disclosure further provides in some embodiments a terminal device, which includes a processor, a memory, and a computer program stored in the memory and capable of being executed by the processor. The computer program is executed by the processor to implement the step of the above-mentioned random access method for the terminal device with a same technical effect, which will not be particularly further defined herein.

Figure 5:
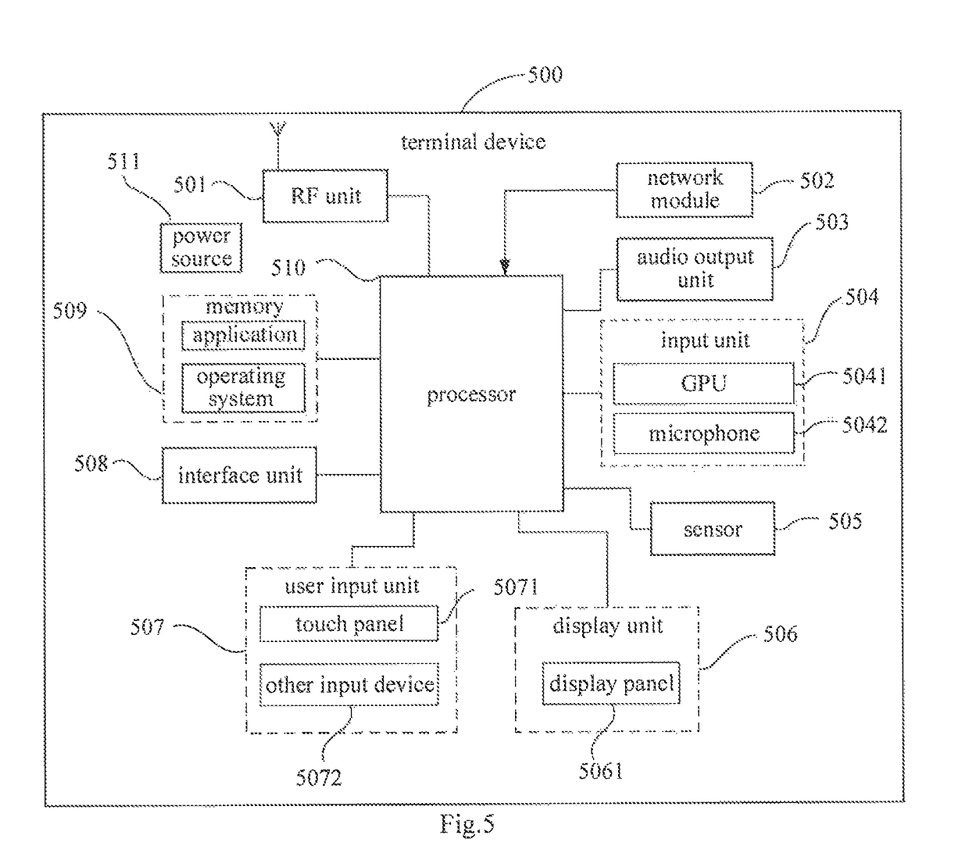
FIG. 5 is another structural schematic view showing the terminal device according to an embodiment of the present disclosure.

To be specific, FIG. 5 shows a hardware structure of the terminal device according to embodiments of the present disclosure. The terminal device 500 may include, but not limited to, a radio frequency (RF) unit 501, a network module 502, an audio output unit 503, an input unit 504, a sensor 505, a display unit 506, a user input unit 507, an interface unit 508, a memory 509, a processor 510, and a power source 511. It should be appreciated that, the structure in FIG. 5 shall not be construed as limiting the terminal device. The terminal device may include more or fewer members, or some members may be combined, or the members may be arranged in different modes. In the embodiments of the present disclosure, the terminal device may include, but not limited to, mobile phone, tablet computer, notebook computer, personal digital assistant, vehicle-mounted terminal, wearable device or pedometer.

The radio frequency unit 501 is configured to transmit a two-step random access request message to a network device. A data part is carried in the two-step random access request message, and the data part is acquired through performing layer-two processing in accordance with layer-two configuration information.

According to the terminal device 500 in the embodiments of the present disclosure, the data part carried in the two-step random access request message may be acquired in accordance with the layer-two configuration information. As a result, it is able to specify protocol stack configuration information desired for data carried by the request message in a two-step random access process, thereby to enable the data part carried in the two-step random access request message to be accurately received by the network side, and improve the data transmission reliability.

It should be appreciated that, in the embodiments of the present disclosure, the radio frequency unit 501 may transmit and receive signals during the information transmission or phone call. To be specific, the radio frequency unit may, upon the receipt of downlink data from a base station, transmit the downlink data to the processor 510 for subsequent treatment. In addition, the radio frequency unit may transmit uplink data to the base station. Usually, the radio frequency unit 501 may include, but not limited to, an antenna, at least one amplifier, a transceiver, a coupler, a low-noise amplifier and a duplexer. In addition, the radio frequency unit 501 may communicate with a network and the other devices via a wireless communications system.

The network module 502 of the terminal device is configured to enable a user to access the broadband Internet in a wireless manner, e.g., help the user to receive and send an e-mail, browse a webpage or access a streaming media.

The audio output unit 503 is configured to convert audio data received by the radio frequency unit 501 or the network module 502, or audio data stored in the memory 509, into an audio signal and output the audio signal as a sound. In addition, the audio output unit 503 is further configured to provide an audio output related to a specific function executed by the terminal device 500 (e.g., a sound occurring when a calling signal or a message has been received). The audio output unit 503 may include a loudspeaker, a buzzer and a receiver.

The input unit 504 is configured to receive an audio or video signal. The input unit 504 may include a graphics processing unit (GPU) 5041 and a microphone 5042. The GPU 5041 is configured to process image data of a static image or video acquired by an image collection unit (e.g., a camera) in a video capturing mode or an image capturing mode, and a processed image frame may be displayed by the display unit 506. The image frame processed by the GPU 5041 may be stored in the memory 509 (or another storage medium) or transmitted via the radio frequency unit 501 or network module 502. The microphone 5042 is configured to receive a sound, and convert the sound into audio data. In a telephone call mode, the processed audio data may be converted into data in a format capable of being transmitted by the radio frequency unit 501 to a mobile communications base station.

The terminal device 500 may further include at least one sensor 505, which may include a light sensor, a movement sensor and another sensors. To be specific, the light sensor may include an ambient light sensor or a proximity sensor. The ambient light sensor is configured to adjust a brightness value of a display panel 5061 in accordance with ambient light. The proximity sensor is configured to turn off the display panel 5061 and/or a backlight source when the terminal device 500 is proximate to an ear of the user. As one of the movement sensors, an accelerometer may detect acceleration in various directions (usually a three-axis accelerometer), and detect a level and a direction of a gravity force when being in a static state. Through the accelerometer, it is able to identify a posture of the terminal (e.g., perform a switching operation between portrait and landscape orientations, play relevant games, and calibrate a posture of a magnetometer), and implement vibration-identification-related functions (e.g., count steps and strikes). The sensor 505 may further include a fingerprint sensor, a pressure sensor, an iris sensor, a molecule sensor, a gyroscope, a barometer, a hygrometer, a thermometer or an infrared sensor, which will not be further particularly defined herein.

The display unit 506 is configured to display information inputted by the user or provided to the user. The display unit 506 may include the display panel 5061, e.g., a liquid crystal display (LCD) panel, or an organic light-emitting diode (OLED) panel.

The user input unit 507 is configured to receive digital or character information inputted by the user, and generate a key signal input related to user settings and function control of the terminal. To be specific, the user input unit 507 may include a touch panel 5071 and another input device 5072. The touch panel 5071, also called as touch screen, is configured to collect a touch operation made by the user on or in proximity to the touch panel 5071 (e.g., an operation made by the user through any appropriate object or attachment (e.g., finger or stylus) on or in the proximity to the touch panel 5071). The touch panel 5071 may include a touch detection device and a touch controller. The touch detection device is configured to detect a touch position of the user and a signal generated due to the touch operation, and transmit the signal to the touch controller. The touch controller is configured to receive touch information from the touch detection device, convert it into coordinates of a touch point, transmit the coordinates to the processor 510, and receive and execute a command from the processor 510. In addition, the touch panel 5071 may be of a resistive type, a capacitive type, an infrared type or a surface acoustic wave type. Besides the touch panel 5071, the user input unit 507 may further include the other input device 5072. The other input device 5072 may include, but not limited to, a physical keyboard, a functional button (e.g., a volume control button, an on/off button), a trackball, a mouse, and a joystick, which will not be further particularly defined herein.

Further, the touch panel 5071 may cover the display panel 5061. When the touch operation made on or in proximity to the touch panel 5071 has been detected, the touch panel 5071 may transmit the touch information to the processor 510, so as to determine a type of a touch event. Then, the processor 510 may control the display panel 5061 to provide a corresponding visual output in accordance with the type of the touch event. Although the touch panel 5071 and the display panel 5061 are configured as two separate members for achieving the input and output functions of the terminal device in FIG. 5, in some embodiments of the present disclosure, they may be integrated so as to achieve the input and output functions of the terminal, which will not be further particularly defined herein.

The interface unit 508 is configured to provide an interface between an external device and the terminal device 500. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 508 is configured to receive an input from the external device (e.g., data information and electricity) and transmit the input to one or more elements of the terminal device 500, or transmit data between the terminal device 500 and the external device.

The memory 509 is configured to store therein a software application and various data. The memory 509 may mainly include an application storage area and a data storage area. An operating system and at least one application for the functions (e.g., an audio playing function, an image playing function) may be stored in the application storage area. Data created in accordance with the operation of the mobile phone (e.g., audio data and phonebook) may be stored in the data storage area. In addition, the memory 509 may include a high-speed random access memory, or a non-volatile memory (e.g., at least one magnetic disk or flash memory), or another volatile solid state memory.

As a control center of the terminal device, the processor 510 may be connected to the other members of the terminal device via various interfaces and circuits, and configured to run or execute the software program and/or module stored in the memory 509, and call the data stored in the memory 509, so as to execute the functions of the terminal device and process the data, thereby to monitor the entire terminal device. The processor 510 may include one or more processing units. Optionally, an application processor and a modem may be integrated into the processor 510. The application processor is mainly configured to process the operating system, a user interface and the application. The modem is mainly configured to process wireless communication. It should be appreciated that, the modem may also not be integrated into the processor 510.

The terminal device 500 may further include the power source 511 (e.g., a battery) configured to supply power to the members of the terminal device 500. Optionally, the power source 511 is logically connected to the processor 510 via a power source management system, so as to achieve such functions as charging, discharging and power consumption management through the power source management system.

In addition, the terminal device 500 may further include some functional modules not shown in FIG. 5, which will not be particularly further defined herein.

The present disclosure further provides in some embodiments a network device, including a processor, a memory, and a computer program stored in the memory and capable of being executed by the processor. The computer program is executed by the processor so as to implement the step of the above-mentioned random access method for the network device with a same technical effect, which will not be further particularly defined herein.

Figure 6:
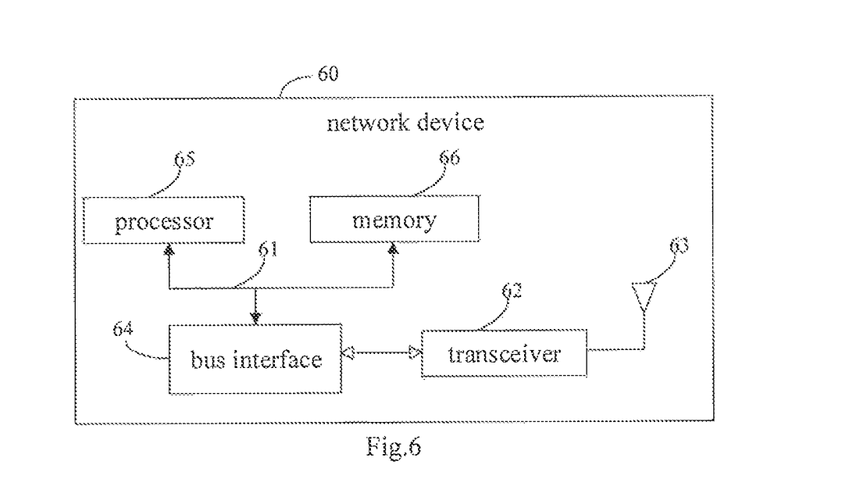
FIG. 6 is another structural schematic view showing the network device according to an embodiment of the present disclosure.

To be specific, FIG. 6 shows a hardware structure of the network device according to embodiments of the present disclosure. The network device 60 may include, but not limited to, a bus 61, a transceiver 62, an antenna 63, a bus interface 64, a processor 65 and a memory 66.

In the embodiments of the present disclosure, the network device 60 may further include a computer program stored in the memory 66 and executed by the processor 65. The computer program is executed by the processor 65 so as to receive a two-step random access request message from a terminal device. A data part may be carried in the two-step random access request message, and the data part may be acquired through performing layer-two processing in accordance with layer-two configuration information.

The transceiver 62 is configured to receive and transmit data under the control of the processor 65.

In FIG. 6, bus architecture (represented by the bus 61) may include a number of buses and bridges connected to each other, so as to connect various circuits for one or more processors represented by the processor 65 and one or more memories represented by the memory 66. In addition, as is known in the art, the bus 61 may be used to connect other circuits, such as a circuit for a peripheral device, a circuit for a voltage stabilizer and a power management circuit, which will not be further particularly defined herein. The bus interface 64 may be provided between the bus 61 and the transceiver 62, and the transceiver 62 may consist of one element, or more than one elements, e.g., transmitters and receivers for communication with other devices over a transmission medium. Data processed by the processor 65 may be transmitted on a wireless medium via the antenna 63. Further, the antenna 63 may further receive data and transmit the data to the processor 65.

The processor 65 may take charge of managing the bus 61 as well as general processings, and may further provide various functions such as timing, peripheral interfacing, voltage adjustment, power source management and other control functions. The memory 66 may store therein data for the operation of the processor 65.

Optionally, the processor 65 may be a CPU, an ASIC, a FPGA or a CPLD.

The present disclosure further provides in some embodiments a computer-readable storage medium storing therein a computer program. The computer program is configured to be executed by a processor, to implement the above-mentioned random access methods with a same technical effect, which will not be further particularly defined herein. The computer-readable storage medium may be, e.g., a read-only memory (ROM), a random access memory (RAM), a magnetic disk or an optical disk.

It should be appreciated that, such words as "include" or "including" or any other variations involved in the present disclosure intend to provide non-exclusive coverage, so that a procedure, method, article or device including a series of elements may also include other elements not listed herein, or may include inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the method embodiments may be implemented by software as well as a necessary common hardware platform, or by hardware, and the former may be better in most cases. Based on this, the technical solutions of the present disclosure, essentially, or parts of the technical solutions of the present disclosure contributing to the prior art, may appear in the form of software products, which may be stored in a storage medium (e.g., ROM/RAM, magnetic disk or optical disk) and include instructions so as to enable a terminal (e.g., mobile phone, computer, server, air conditioner or network device) to execute the method in the embodiments of the present disclosure.

The embodiments of the present disclosure have been described above with reference to the drawings, but the present disclosure is not limited to the above-mentioned specific embodiments. The above-mentioned specific embodiments are only illustrative and not restrictive. Under the teaching of the present disclosure, a person skilled in the art may make various modifications without departing from the principle of the present disclosure and the protection scope of the claims, which shall also fall within the scope of the present disclosure.

What is claimed is:

1. A random access method for a terminal device in a New Radio (NR) system, comprising:
   transmitting a two-step random access request message to a network device;
   wherein a data part is carried in the two-step random access request message, and the data part is acquired through performing layer-two processing in accordance with layer-two configuration information,
   when the layer-two configuration information comprises packet data convergence protocol (PDCP) layer configuration information, and the PDCP layer configuration information comprises indication information indicating that a default value of a PDCP sequence number (SN) size is a short PDCP SN size, the short PDCP SN size is a shortest one of all of the PDCP SN sizes, prior to transmitting the two-step random access request message to the network device, the random access method further comprises:
numbering, through the PDCP layer entity, data delivered by the SDAP layer entity in accordance with the short PDCP SN size, and delivering the numbered data to an RLC layer entity, to acquire the data part;
and/or
when the layer-two configuration information comprises radio link control (RLC) layer configuration information and the RLC layer configuration information comprises indication information indicating that a default RLC transmission mode is a Transparent Mode (TM), prior to transmitting the two-step random access request message to the network device, the random access method further comprises:
directly delivering, through an RLC layer entity, data delivered by the PDCP layer entity to an MAC layer entity via a logic channel in the TM, to acquire the data part.

2. The random access method according to claim 1, wherein the layer-two configuration information further comprises:
service data adaption protocol (SDAP) layer configuration information.

3. The random access method according to claim 1, wherein prior to transmitting the two-step random access request message to the network device, the random access method further comprises:
receiving the layer-two configuration information transmitted from the network device.

4. The random access method according to claim 3, wherein the layer-two configuration information is received through a system broadcasting message, or the layer-two configuration information is received through a radio resource control (RRC) release message.

5. The random access method according to claim 1, wherein a configuration type of the layer-two configuration information is a cell-specific configuration or a radio access network (RAN)-specific configuration.

6. The random access method according to claim 5, wherein when the configuration type of the layer-two configuration information is the cell-specific configuration, after completion of cell reselection by the terminal device,
the terminal device updates, in accordance with agreement in a protocol, the layer-two configuration information as layer-two configuration information corresponding to a new cell; or
the terminal device updates, in accordance with an acquired system broadcasting message of the new cell, the layer-two configuration information as the layer-two configuration information corresponding to the new cell.

7. The random access method according to claim 1, wherein when the layer-two configuration information further comprises the SDAP layer configuration information, and the SDAP layer configuration information comprises default data radio bearer (DRB) information, prior to transmitting the two-step random access request message to the network device, the random access method further comprises:
mapping, through an SDAP layer entity, data delivered by an upper layer to a default DRB corresponding to the default DRB information, and delivering the data to a PDCP layer entity associated with the default DRB, to acquire the data part; and/or
when the layer-two configuration information comprises media access control (MAC) layer configuration information, the MAC layer configuration information comprises a default value of a logic channel and a priority value corresponding to the logic channel, prior to transmitting the two-step random access request message to the network device, the random access method further comprises:
when data has been received through the MAC layer entity from a plurality of default logic channels, multiplexing a logic channel for data transmission in accordance with the priority values corresponding to the plurality of default logic channels.

8. The random access method according to claim 1, wherein subsequent to transmitting the two-step random access request message to the network device, the random access method further comprises:
receiving a two-step random access response message transmitted from the network device;
when the two-step random access response message comprises indication information indicating that the data part has not been received successfully yet, retransmitting the data part in accordance with default maximum hybrid automatic repeat request (HARQ) retransmission times.

9. A random access method for a network device in a NR system, comprising:
receiving a two-step random access request message from a terminal device;
wherein a data part is carried in the two-step random access request message, and the data part is acquired through performing layer-two processing in accordance with layer-two configuration information,
when the layer-two configuration information comprises PDCP layer configuration information, and the PDCP layer configuration information comprises indication information indicating that a default value of a PDCP SN size is a short PDCP SN size, the short PDCP SN size is a shortest one of all of the PDCP SN sizes, and the data part is acquired by numbering, through the PDCP layer entity, data delivered by the SDAP layer entity in accordance with the short PDCP SN size, and delivering the numbered data to an RLC layer entity;
and/or
when the layer-two configuration information comprises RLC layer configuration information and the RLC layer configuration information comprises indication information indicating that a default RLC transmission mode is a TM, the data part is acquired by directly delivering, through an RLC layer entity, data delivered by the PDCP layer entity to an MAC layer entity via a logic channel in the TM.

10. The random access method according to claim 9, wherein the layer-two configuration information further comprises:
SDAP layer configuration information.

11. The random access method according to claim 10, wherein prior to receiving the two-step random access request message from the terminal device, the random access method further comprises:
transmitting the layer-two configuration information to the terminal device.

12. The random access method according to claim 11, wherein the layer-two configuration information is transmitted through a system broadcasting message, or the layer-two configuration information is transmitted through an RRC release message.

13. The random access method according to claim 9, wherein a configuration type of the layer-two configuration information is a cell-specific configuration or an RAN-specific configuration.

14. The random access method according to claim 9, wherein subsequent to receiving the two-step random access request message from the terminal device, the random access method further comprises:
 decoding, through an MAC layer entity, the data part;
 when the MAC layer entity has successfully decoded the data part, feeding back that the data part has been successfully received through a two-step random access response message; and
 when the MAC layer entity fails to decode the data part, feeding back that the data part has not been received successfully yet through the two-step random access response message.

15. A network device, comprising a memory, a processor, and a computer program stored in the memory and capable of being executed by the processor, wherein the computer program is configured to be executed by the processor to implement the step of the random access method according to claim 9.

16. A terminal device in a NR system, comprising a memory, a processor, and a computer program stored in the memory and capable of being executed by the processor, wherein the computer program is configured to be executed by the processor to:
 transmit a two-step random access request message to a network device;
 wherein a data part is carried in the two-step random access request message, and the data part is acquired through performing layer-two processing in accordance with layer-two configuration information,
 when the layer-two configuration information comprises PDCP layer configuration information, and the PDCP layer configuration information comprises indication information indicating that a default value of a PDCP SN size is a short PDCP SN size, the short PDCP SN size is a shortest one of all of the PDCP SN sizes, the computer program is further configured to be executed by the processor to: prior to transmitting the two-step random access request message to the network device,
 number, through the PDCP layer entity, data delivered by the SDAP layer entity in accordance with the short PDCP SN size, and deliver the numbered data to an RLC layer entity, to acquire the data part;
 and/or
 when the layer-two configuration information comprises RLC layer configuration information and the RLC layer configuration information comprises indication information indicating that a default RLC transmission mode is a TM, the computer program is further configured to be executed by the processor to: prior to transmitting the two-step random access request message to the network device,
 directly deliver, through an RLC layer entity, data delivered by the PDCP layer entity to an MAC layer entity via a logic channel in the TM, to acquire the data part.

17. The terminal device according to claim 16, wherein the layer-two configuration information further comprises:
 SDAP layer configuration information.

18. The terminal device according to claim 16, wherein the computer program is further configured to be executed by the processor to: prior to transmitting the two-step random access request message to the network device,
 receive the layer-two configuration information transmitted from the network device.

19. The terminal device according to claim 18, wherein the layer-two configuration information is received through a system broadcasting message, or the layer-two configuration information is received through a RRC release message.

20. The terminal device according to claim 16, wherein a configuration type of the layer-two configuration information is a cell-specific configuration or a RAN-specific configuration.

* * * * *